United States Patent
Kim et al.

(10) Patent No.: US 6,300,981 B1
(45) Date of Patent: Oct. 9, 2001

(54) IMAGE DATA STORAGE/DISPLAY APPARATUS AND METHOD FOR TELEVISION RECEIVER HAVING VIEWER'S SCREEN DISPLAY FUNCTION

(75) Inventors: Joo Won Kim, Kyoungsangbuk-Do; Jae Kyung Lee, Taegu; Jin Kuk Jeoung; Bong Chun Shim, both of Kyoungsangbuk-Do; Gwon Sool Jung, Taegu, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/096,533

(22) Filed: Jun. 12, 1998

(30) Foreign Application Priority Data

Jun. 13, 1997 (KR) ............................................... P97-24537

(51) Int. Cl.[7] ...................................................... H04N 5/445
(52) U.S. Cl. ........................... 348/563; 348/564; 348/563; 348/634
(58) Field of Search ..................................... 348/559, 560, 348/634, 635, 631, 725, 728, 731, 231; H04N 5/445, 5/44

(56) References Cited

U.S. PATENT DOCUMENTS 5,703,662 * 12/1997 Yoon ..................................... 348/728
5,712,681 * 1/1998 Suh ....................................... 348/231

* cited by examiner

Primary Examiner—David E. Harvey

(57) ABSTRACT

An image data storage/display apparatus and method for a television receiver having a viewer's screen display function whereby a desired image is stored, and the stored image is automatically displayed on the screen when no video signal is inputted or when the channel or the input terminal is changed. The image data storage/display apparatus includes a video input section for inputting a video signal, a first switch for being switched to a video input terminal or to the video input section, a data storage section for temporarily storing the video signal inputted from the first switch in a first memory, outputting the video signal stored in the first memory to display the video signal as an image when a still mode is set, and storing the video signal in a second memory when a signal for storing the displayed video signal is inputted, a second switch for switching the video signal inputted from the video input terminal or an output signal of the data storage section, a video processing section for processing the video signal from the second switch to output a processed signal to the CRT, a video detecting section for detecting whether or not the video signal is inputted through the video input terminal, and a microcomputer for controlling the data storage section so that the viewer can store and display an image on the screen when a corresponding key signal is inputted or when it is detected by the video detecting section that no video signal is inputted through the video input terminal.

6 Claims, 12 Drawing Sheets

IMAGE DATA STORAGE/DISPLAY APPARATUS AND METHOD FOR TELEVISION RECEIVER HAVING VIEWER'S SCREEN DISPLAY FUNCTION

BACKGROUND OF THE INVENTION

1. Field of the Invention

The present invention relates to an image data storage/display apparatus and method for a television receiver having a viewer's screen display function.

2. Description of the Related Art

In general, a television receiver (TV) receives a multi-channel radio-frequency (RF) signal transmitted from a broadcasting station, and performs video/audio signal processing to output an image signal to a cathode ray tube (CRT) and to output an audio signal to a loudspeaker. In a TV having a still mode function, input video signals are sequentially stored in a memory of a predetermined size, and if a still mode is set, the stored video signal is repeatedly outputted to display a still image on the CRT screen.

As illustrated in FIG. 1, a TV having a still mode function includes a video memory 104 for storing video signals Vp inputted from the broadcasting station or outside, a switch 101 for selecting the video signal Vp in a normal mode and selecting an output signal Vm of the video memory 104 in a still mode, a video processing section 102 for processing an output signal Vs of the switch 101 and outputting the processed video signal to a CRT 103, an audio processing section 107 for processing an audio signal Ap inputted from the broadcasting station or outside and outputting the processed audio signal Ap to a loudspeaker 108, and a microcomputer 106 for discriminating whether the present mode is a normal mode or a still mode by checking an output signal from a key input section 105, and outputting a control signal Cs to the switch 101 according to the result of discrimination. The microcomputer 106 also outputs a control signal Cv for controlling contrast, sharpness, tint, etc. of the CRT 103 to the video processing section 102; a control signal Cm for reading/writing image data from/in the video memory 104; and a control signal Ca for controlling volume to the audio processing section 107.

The video processing section 102 may comprise a video matrix circuit.

In FIG. 1, the reference numberal 109 denoted a video input terminal through which a video signal from the broadcasting station or from external audio-video appliances such as video cassette recorders and video cameras, and the reference number 110 denotes an audio input terminal.

The operation of the conventional TV as constituted above will now be explained.

The microcomputer 106 checks an output signal of the key input section 105 to discriminate whether the current mode is a normal mode or a still mode.

If the microcomputer 106 discriminates that the current mode is the normal mode, it outputs the control signal Cs to the switch 101, and the switch 101 connects the video input terminal 109 to the video processing section 102. The video processing section 102 processes the video signal Vp inputted from the video input terminal 109 to display the video signal on the screen of the CRT 103. At this time, the contrast, sharpness, or tint of the CRT 103 is controlled according to the control signal Cv from the microcomputer 106.

While displaying the video signal Vp inputted from the video input terminal 109 on the screen of the CRT 103 as described above, the video memory 104 sequentially stores therein the video signal Vp according to the control signal Cm from the microcomputer 106.

Meanwhile, the audio signal Ap inputted through the audio input terminal 110, which corresponds to the video signal displayed on the screen of the CRT 103, is processed by the audio processing section 107, and outputted to the loudspeaker 108. At this time, the volume is controlled according to the control signal Ca from the microcomputer 106.

During the above-described operation, if a user pushes a still button in the key input section 105 to view the image of a certain scene displayed on the CRT screen, the microcomputer 106 discriminates the still mode by checking the output signal from the key input section 105, and outputs the control signal Ca to the switch 101. Accordingly, the switch 101 connects the output terminal of the video memory 104 to the input terminal of the video processing section 102.

The microcomputer 106 also outputs the control signal Cm to the video memory 104, so that the video signal Vm stored in the video memory 104 is sequentially outputted to the video processing section 102.

As a consequence, the video processing section 102 processes the video signal Vm from the video memory 104, and displays the processed video signal as a still image on the screen of the CRT 103.

If the user selects a still release key in the key input section 105, the switch 101 connects the video input terminal 109 to the video processing section 102 according to the control signal Cs from the mcirocomputer 106. The video memory 104 is in a write mode for storing therein the video signal Vp from the video input terminal 109 according to the control signal Cm from the microcomputer 106.

As a result, the normal mode is resumed to display the image on the screen of the CRT 103, and the audio signal corresponding to the displayed image is outputted to the loudspeaker 108.

However, such a conventional art has a problem that the image data of the current scene may be lost if the still mode function is released or another still image is displayed on the screen. Further, since the still image is displayed by the viewer's key manipulation, the viewer may feel bored if no video signal is transmitted from the TV broadcasting station, or if the channel or the input terminal is changed.

SUMMARY OF THE INVENTION

It is an object of the present invention to solve the problems involved in the related art, and to provide an image data storage/display apparatus and method for a television receiver having a viewer's screen display function whereby a desired image is stored, and the stored image is automatically displayed on the screen when no video signal is inputted or when the channel or the input terminal is changed, so that the viewer may not be bored.

In one aspect of the present invention, there is provided an image data storage/display apparatus for a television receiver having a viewer's screen display function, comprising a video input section for inputting a video signal, a first switch for being switched to a video input terminal or the video input section, a data storage section for temporarily storing the video signal inputted from the first switch in a first memory, outputting the video signal stored in the first memory to display the video signal as an image when a still mode is set, and storing the video signal in a second memory when a signal for storing the displayed video signal is inputted, a second switch for switching the video signal inputted from the video input terminal or an output signal of the data storage section, a video processing section for processing the video signal from the second switch to output a processed signal to the CRT, a video detecting section for detecting whether or not the video signal is inputted through the video input terminal, and a microcomputer for controlling the data storage section so that the viewer can store and display an image on the screen when a corresponding key signal is inputted or when it is detected by the video detecting section that no video signal is inputted through the video input terminal.

The data storage section may comprise a digital-to-analog (A/D) conversation section for converting the video signal from the first switch into a digital signal, a first memory for temporarily storing an output signal of the A/D conversion means, a second memory for storing video data for the viewer's screen, a digital-to-analog (D/A) conversion section for converting an output signal of the first memory into an analog signal, and outputting the analog signal to the second switch, and a memory control section for controlling the data input/output through the A/D conversion section, D/A conversion section, and the first memory, and controlling the data input/output between the first memory and the second memory and a switching operation of the second switch when a mode for storing and displaying the viewer's screen is set.

In another aspect of the present invention, there is provided an image data storage/display apparatus for a television receiver having a viewer's screen display function, comprising a video input section for inputting a video signal, a first switch for being switched to a video input terminal or the video input section, a data storage section for temporarily storing a video signal inputted from the first switch in a first memory, outputting the video signal stored in the first memory to display the video signal as an image when a still mode is set, storing edited and fed-back video data in the first memory, and then storing the video signal of the first memory in a second memory when a signal for storing the video data for a user's screen is inputted, an on-screen processing section for processing on-screen data and outputting an on-screen signal, a second switch for being switched to the video input terminal, the data storage section, or the on-screen processing section, a video processing section for processing the video signal from the second switch to output a processed signal to the CRT, a video detecting section for detecting whether or not the video signal is inputted through the video input terminal, and a microcomputer for controlling the data storage section and the on-screen processing section to display the viewer's screen when the storage, display, and edition of the viewer's screen are selected by means of a corresponding key input, or when it is detected by the video detecting section that no video signal is inputted through the video input terminal.

The data storage section may comprise a digital-to-analog (A/D) conversion section for converting the video signal from the first switch into a digital signal, a first memory for temporarily storing an output signal of the A/D conversion means, a second memory for storing video data for the viewer's screen, a digital-to-analog (D/A) conversion section for converting an output signal of the first memory into an analog signal, and a memory control section for controlling the data input/output through the A/D conversion section, the D/A conversion section, and the first memory, controlling the data input/output between the first memory and the second memory and a switching operation of the second switch when a mode for storing and displaying the viewer's screen is set, and feeding an output signal of the first switch back to the first memory.

In still another aspect of the present invention, there is provided an image data storage/display method for a television receiver having a viewer's screen display function and including a key input section having a still key, an image editing key, an image storage key, a channel search key, and a standby key, a first memory and a second memory for storing and reading out video data, the method comprising the steps of discriminating whether a key is inputted or no video signal is detected, processing and displaying on a screen the data stored in the first memory when the still key is inputted at the discriminating step, editing an image according to a viewer's key input when the image editing key is inputted at the discriminating step, transferring and storing the data of the first memory, which corresponds to the image being displayed on the screen, in the second memory when the image storage key is inputted at the discriminating step, transferring and storing the data of the second memory in the first memory, processing and displaying the data stored in the first memory as a viewer's screen when the image display key is inputted at the discriminating step, transferring and storing the data of the second memory in the first memory, processing and displaying the data stored in the first memory as the viewer's screen after the termination of a channel search if the channel search key is inputted at the discriminating step, transferring and storing the data of the second memory in the first memory, processing and displaying the data stored in the first memory as the viewer's screen when it is detected that no video signal is inputted at the discriminating step, and supplying a power only to specified circuits, transferring and storing the data of the second memory in the first memory, processing and displaying the data stored in the first memory as the viewer's screen when the standby key is inputted at the discriminating step.

BRIEF EXPLANATION OF THE DRAWINGS

The above object, other features and advantages of the present invention will become more apparent by describing the preferred embodiments thereof with reference to the accompanying drawings, in which.

DETAILED DESCRIPTION OF THE PREFERRED EMBODIMENTS

Figure 1:
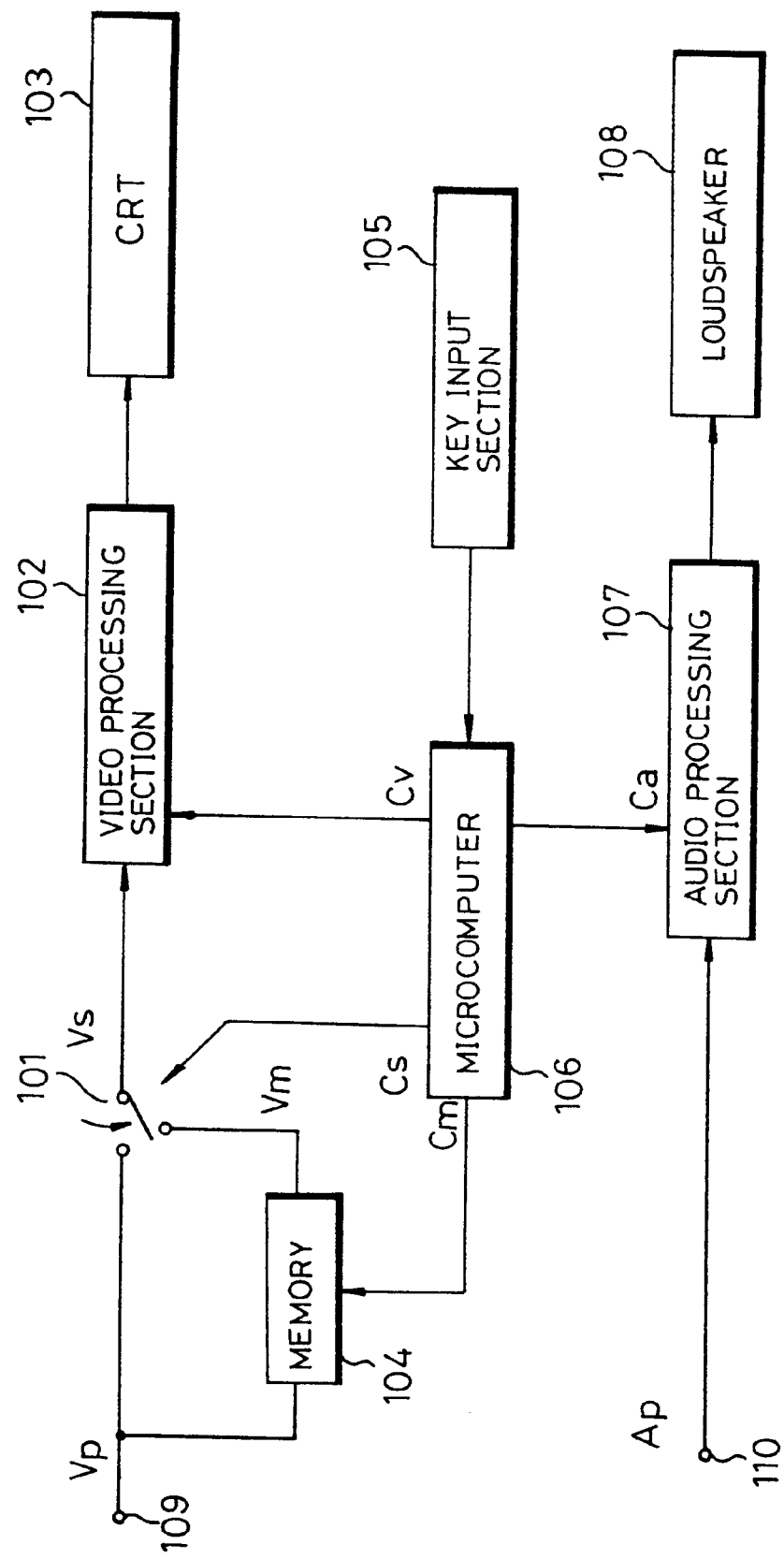
FIG. 1 is a schematic block diagram of a conventional image data storage/display apparatus for a TV.
Figure 2:
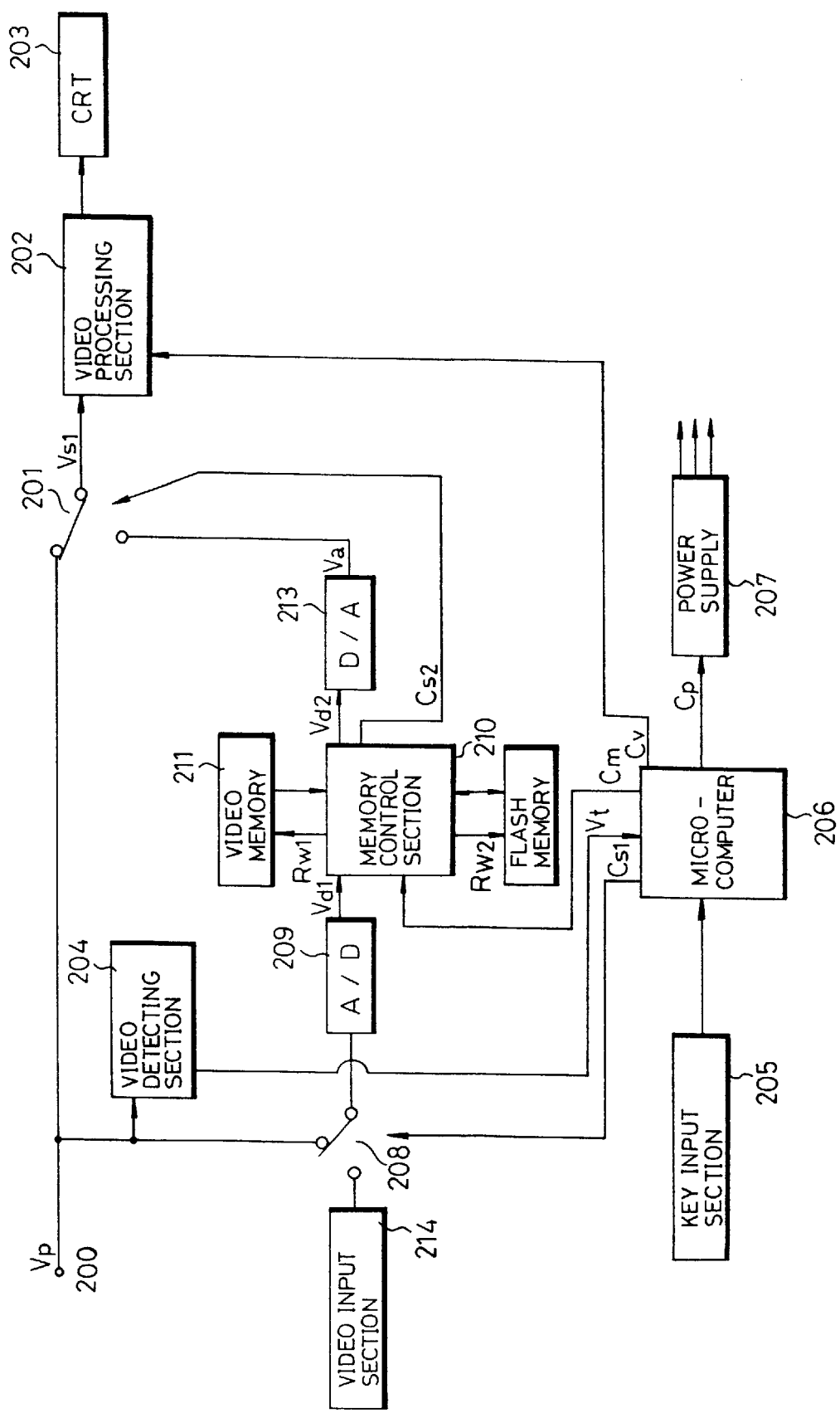
FIG. 2 is a block diagram of the image data storage/display apparatus for a TV according to an embodiment of the present invention.

FIG. 2 is a block diagram of the image data storage/display apparatus for a TV according to an embodiment of the present invention.

Referring to FIG. 2, the image data storage/display apparatus according to the present invention includes a video input section 214 for inputting a video signal, a switch 208 for being switched to a video input terminal 200 or the video input section 214, an A/D conversion section 209 for converting a video signal Vs2 outputted through the switch 208 into a digital signal, a video memory 211 for temporarily storing an output signal Vd1 of the A/D conversion section 209, a flash memory 212 for storing image data for a viewer's screen, a D/A conversion section 213 for converting an output signal of the video memory 211 into an analog signal, a switch 201 for selecting either the video signal from the video input terminal 200 or an output signal of the D/A conversion section 213, a video processing section 202 for processing the video signal Vs1 through the switch 201 and outputting the processed signal to a CRT 203, a memory control section 210 for controlling the data input/output among the A/D conversion section 209, the D/A conversion section 213 and the video memory 211, controlling the data input/output between the video memory 211 and flash memory 212 when a mode for storing and displaying the viewer's screen is set, and outputting a signal Cs2 for controlling the switching operation of the switch 201, a video detecting section 204 for detecting whether a video signal is inputted to the video input terminal 200, a microcomputer 206 for outputting a control signal Cm for controlling the memory control section 210 to store and display the viewer's screen when a still mode or a mode for storing and displaying the viewer's screen is set through a key input section 205, or when it is detected that no video signal is inputted by the video detecting section 204, and a power supply section 207 for supplying the power to the above described sections under the control of the microcomputer 206.

Figure 3:
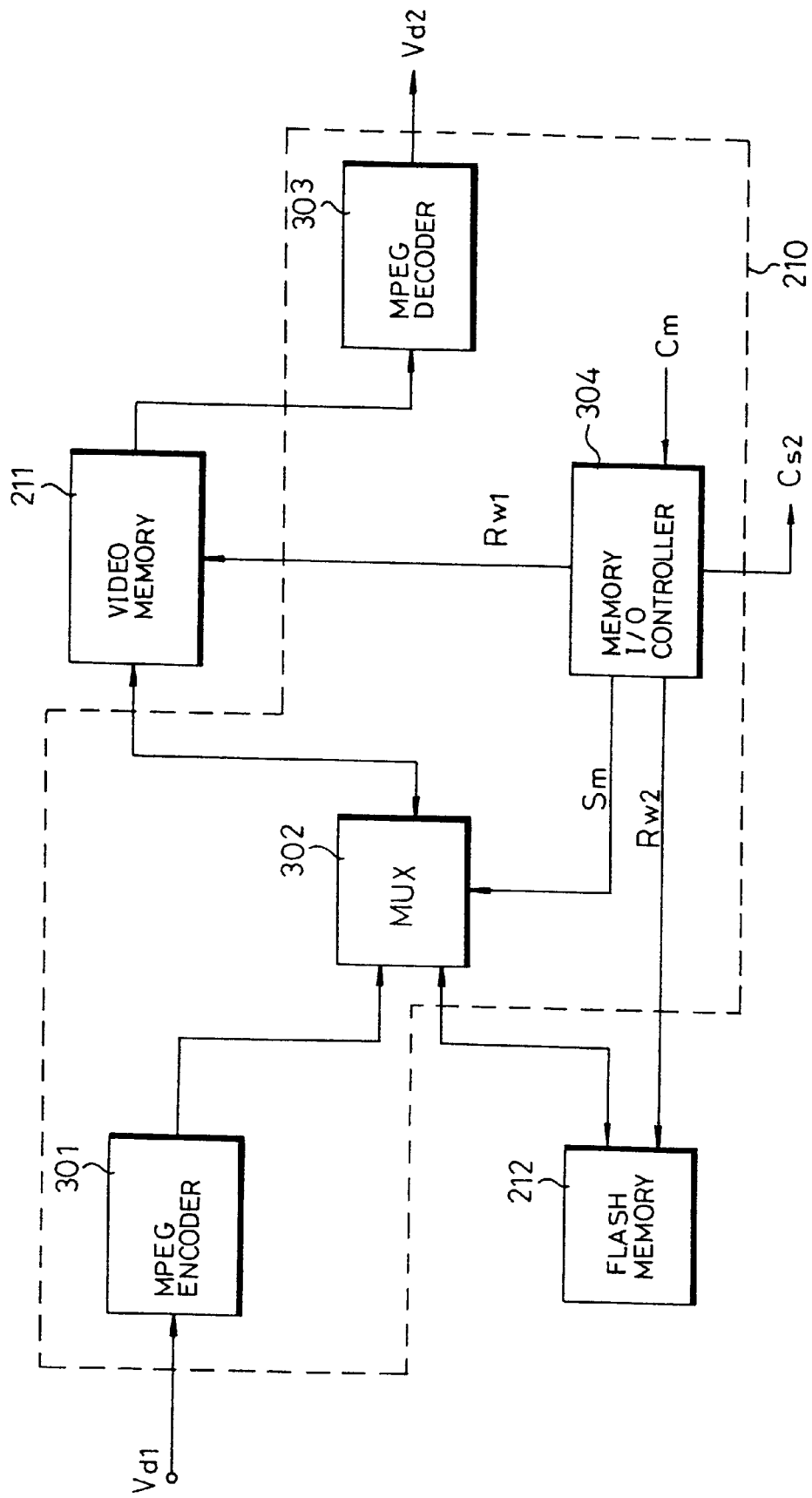
FIG. 3 is a block diagram of the memory control section in FIG. 2.

As illustrated in FIG. 3, the memory control section 201 includes an MPEG encoder 301 for compressing the output signal Vd1 of the A/D conversion section 209, a multiplexer 302 for connecting the A/D conversion section 209 or the flash memory 212 to the video memory 211, an MPEG decoder 303 for decoding and expanding the output signal of the video memory 211 and outputting the decoded and expanded signal to the D/A conversion section 213, and a memory input/output controller 304 for controlling the operation of the multiplexer 302, video memory 211, and flash memory 212, and the switching operation of the switch 201 under the control of the microcomputer 206.

Figure 4:
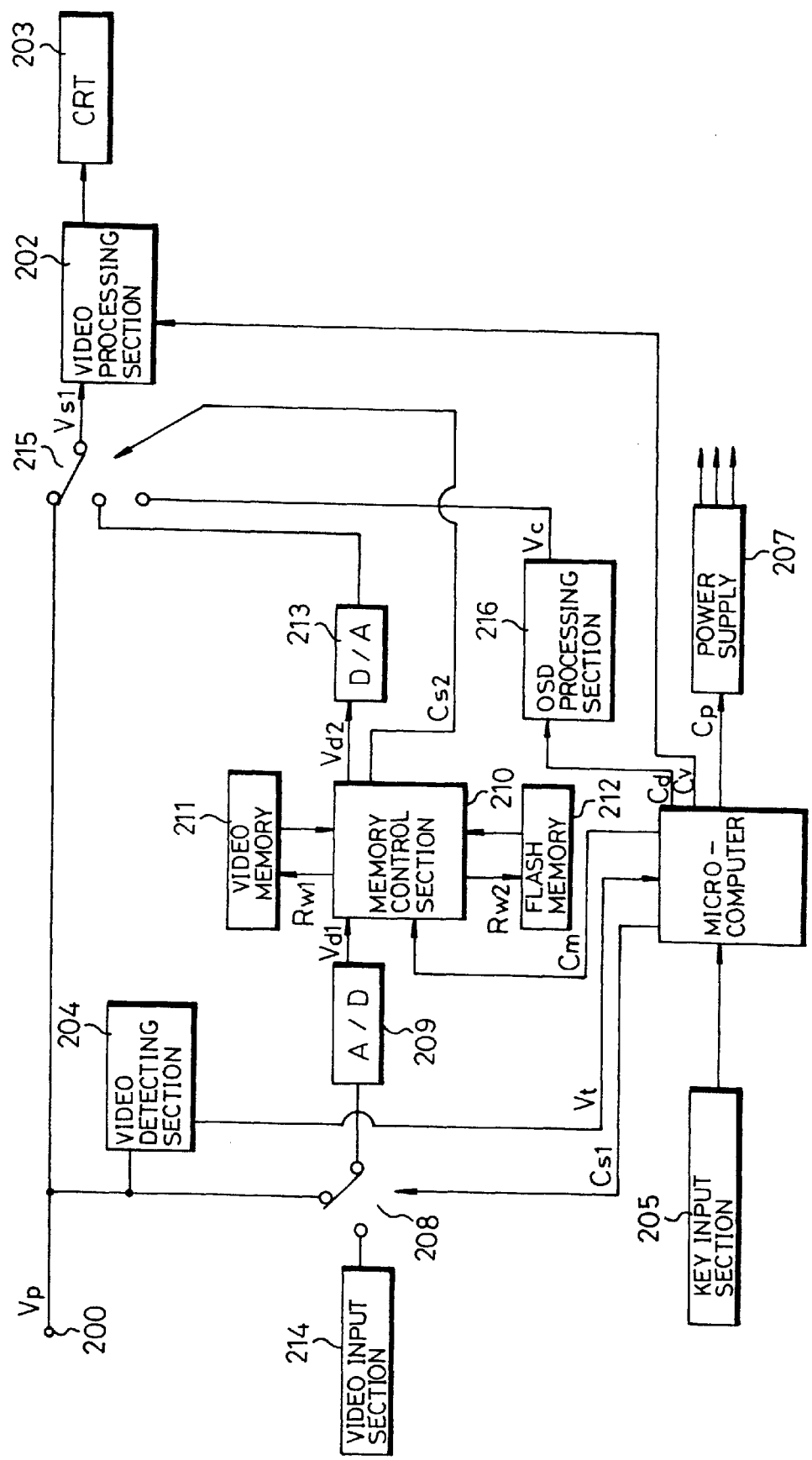
FIG. 4 is a block diagram of the image data storage/display apparatus for a TV according to another embodiment of the present invention.

FIG. 4 is a block diagram of the image data storage/display apparatus for a TV according to another embodiment of the present invention.

Figure 5:
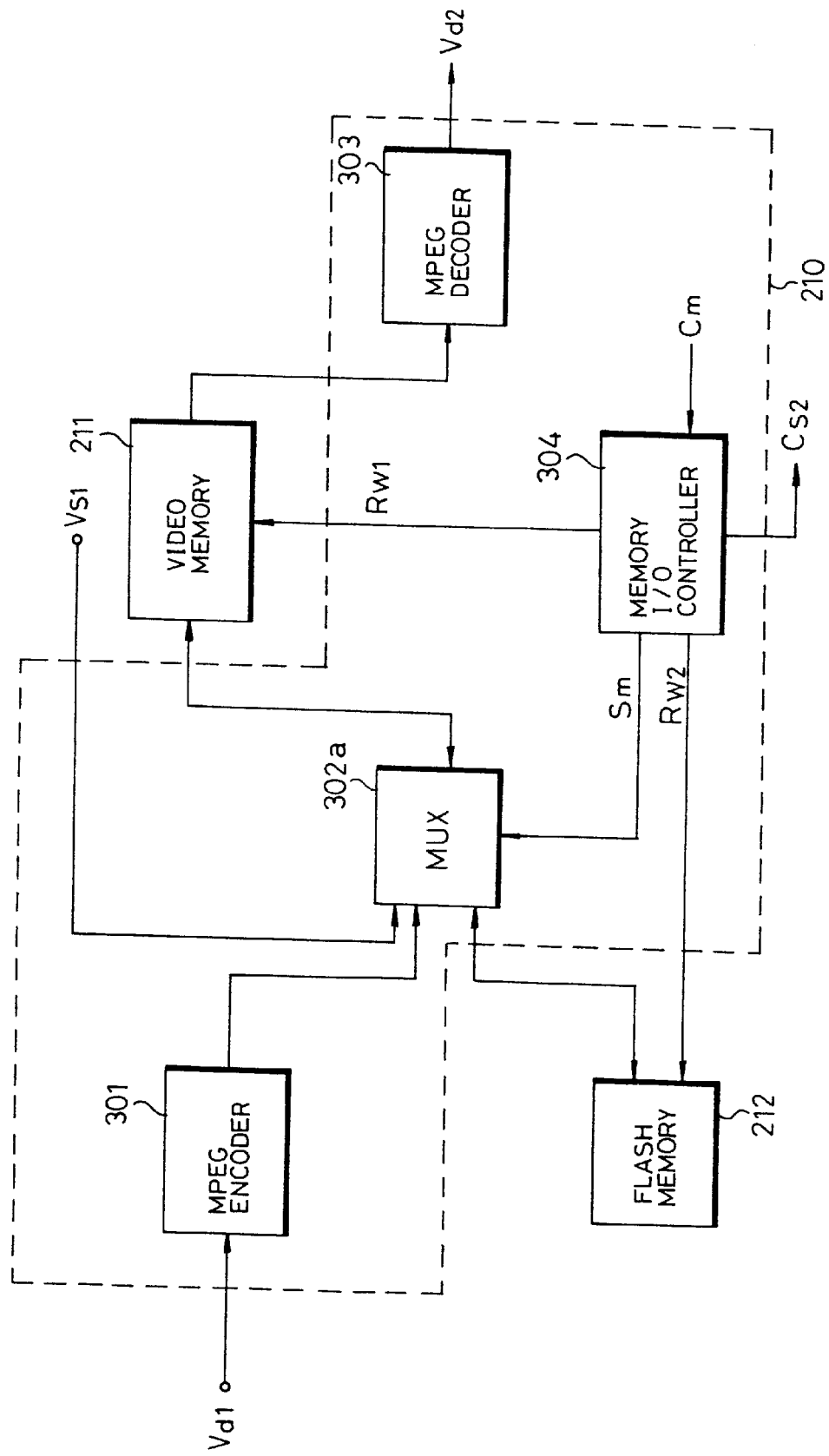
FIG. 5 is a block diagram of the memory control section in FIG. 3.

Referring to FIG. 4, the image data storage/display apparatus according to the present invention includes a video input section 214 for inputting a video signal, a switch 208 for being switched to a video input terminal 200 or the video input section 214, an A/D conversion section 209 for converting a video signal Vs2 outputted through the switch 208 into a digital signal, a video memory 211 for temporarily storing an output signal Vd1 of the A/D conversion section 209, a flash memory 212 for storing image data for a viewer's screen, a D/A conversion section 213 for converting an output signal of the video memory 211 into an analog signal, an on-screen processing section 216 for outputting on-screen data, a switch 215 for being switched to the video input terminal 200, the D/A conversion section 213, or the on-screen processing section 216, a video processing section 202 for processing the video signal Vs1 through the switch 215 and outputting the processed signal to a CRT 203, a memory control section 210 for controlling the data input/output among the A/D conversion section 209, the D/A conversion section 213, and the video memory 211, controlling the data input/output between the video memory 211 and the flash memory 212, and the switching operation of the switch 215 when a mode for storing and displaying the viewer's screen is set, and feeding the output signal Vs1 of the switch 215 back to the video memory 211 when a video editing mode is set, a video detecting section 204 for detecting whether a video signal is inputted to the video input terminal 200, a microcomputer 206 for outputting control signals Cm and Cd for controlling the memory control section 210 and the on-screen processing section 216 to store, display, and edit the viewer's screen when a still mode or the mode for storing and displaying the viewer's screen is set through a key input section 205, or when it is detected that no video signal is inputted by the video detecting section 204, and a power supply section 207 for supplying the power to the above described sections in accordance with a control signal Cp of the microcomputer 206. As illustrated in FIG. 5, the memory control section 210 includes an MPEG encoder 301 for compressing the output signal Vd1 of the A/D conversion section 209, a multiplexer 302a for connecting the MPEG encoder 301, the flash memory 212, or the switch 215 to the video memory 211, an MPEG decoder 303 for decoding and expanding the output signal of the video memory 211, and a memory input/output controller 304 for outputting signals Sm, RW1, RW2, Cs2 for controlling the operation of the multiplexer 302a, the video memory 211, the flash memory 212, and the switch 215 under the control of the microcomputer 206.

Figures 6A, 6B:
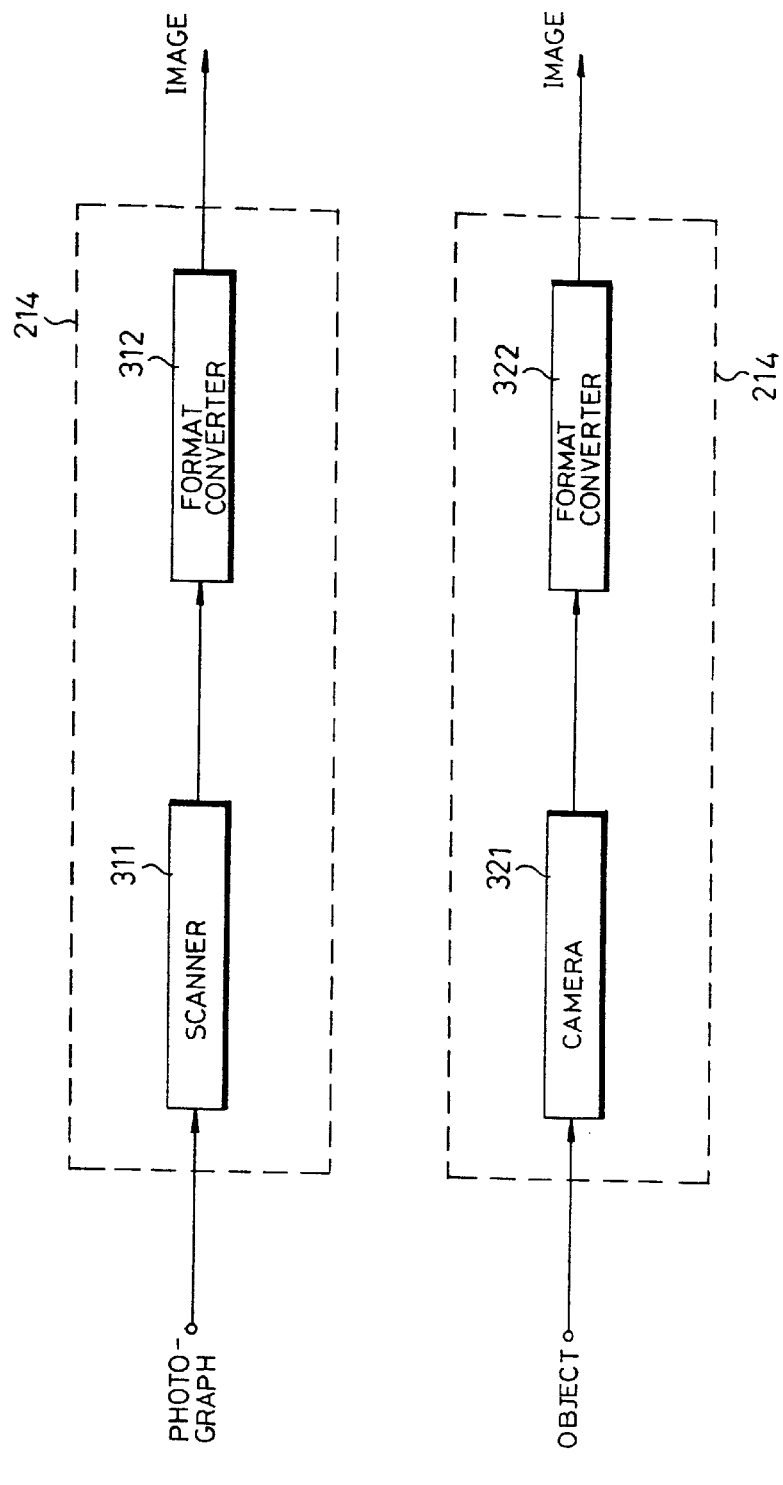
FIGS. 6A and 6B are block diagrams of the image input sections in FIGS. 2 and 3, respectively.

As illustrated in FIG. 6A, the video input section 214 may comprise a scanner 311 for obtaining image data of the viewer's screen, and a format conversion section 312 for converting the output signal of the scanner 311 into a signal suitable for the TV format.

Also, as illustrated in FIG. 6B, the video input section 214 may comprise a video camera 321 for obtaining image data by photographing an object, and a format conversion section 312 for converting the output signal of the camera 321 into a signal suitable for the TV format.

The video memory 211 may comprise a video RAM for a still image display at a speed of faster than a number of nano seconds.

The flash memory 212 comprises a rewritable ROM for storing the image for the viewer's screen at a speed of a number of miliseconds, which can maintain the stored data. The flash memory 212 may comprise an EEPROM instead.

The video processing section 202 comprises a matrix circuit for processing color signals.

The operation and effect of the embodiments of the present invention will now be explained.

In the embodiments of the present invention, when an image for the viewer's screen is externally inputted by the user using the video input section 214, the switch 208 is switched onto the video input section 214 according to the control signal CS1 outputted from the microcomputer 206.

FIGS. 6A and 6B are block diagrams of the embodiments of the video input section 214.

Referring to FIG. 6A, the viewer obtains image data by scanning the desired picture with the scanner 311. The format conversion section 312 then converts the output signal of the scanner 311 into a signal suitable for the TV format, and output the converted signal to the switch 208.

Referring to FIG. 6B, the viewer obtains image data by photographing an object with the video camera 321. The format conversion section 312 then converts the output signal of the camera 321 suitable for the TV format, and outputs the converted signal to the switch 208.

If the viewer inputs a desired image through AV appliances such as a tuner (not illustrated) of the TV, a VCR, a camcoder, etc., the microcomputer 206 receives the corresponding signal from the key input section 205, and outputs the control signal Cs1 to the switch 208, so that the switch 208 is switched onto the video input terminal 200.

Accordingly, the video signal Vs2 inputted through the switch 208 is converted into the digital data Vd1 by the A/D conversion section 209, and the memory control section 210 receives the digital data Vd1, compresses the received data, and outputs the control signal RW1 to store the compressed data in the video memory 211.

If a still mode is set through the key input section 205 thereafter, the memory control section 210 receives the control signal Cm from the microcomputer 206, and outputs a selection control signal Cs2 to connect the switch 201 or 215 to the D/A conversion section 213, while outputting the data stored in the video memory 211 to the D/A conversion section 213, so that the video data is displayed on the screen of the CRT 203 via the video processing section 202.

Specifically, if an image desired by the viewer among the images displayed on the screen of the CRT 203 is selected, the image storage key is inputted by the viewer through the key input section 205. Accordingly, the memory control section 210 transmits the data from the video memory 211, which corresponds to the displayed image, to the flash memory 212.

The storage of the video signal Vp inputted through the video input terminal 200 as the image for the viewer's screen will now be explained in detail.

The video signal Vp inputted through the video input terminal 200 is processed by the video processing section 202, and then displayed on the screen of the CRT 203. At the same time, the video signal Vp of the video input terminal 200 is converted into the digital signal Vd1 by the A/D converter 209, and then sequentially stored in the video memory 211 according to the control signal RW1 from the control section 210.

The microcomputer 206 continues to detect the output signal from the key input section 205 to discriminate whether any key is inputted by the user. If the still key is inputted, the microcomputer 206 outputs the control signal Cm to the memory control section 210, and thus the memory control section 210 outputs the control signal Cs2 to the switch 201, so that the switch 201 is switched onto the D/A converter 213.

The memory control section 210 outputs the data stored in the video memory 211 to the D/a converter 213 to convert the data into an analog signal, and the analog signal is outputted to the video processing section 202 through the switch 201 to be processed. The CRT 203 displays the processed video signal as a still image on the CRT screen.

If the user input the key for storing the image for the viewer's screen through the key input section 205 while the image is displayed in the still mode, the corresponding image is stored.

The microcomputer 206 receives the output signal corresponding to the key for storing the image for the viewer's screen through the key input section 205, and outputs the control signal Cm to the memory control section 210 for storing the current displayed image in the flash memory 212.

The input/output controller 304 in the memory control section 210 outputs the selection control signal Sm to the multiplexer 302, so that the data bus between the video memory 211 and the flash memory 212 is connected. Also, the memory control section 210 reads out the data corresponding to the current image which is displayed on the screen of the CRT 203 from the video memory 211, and stores the read-out data in the flash memory 212 by outputting the control signals RW1, RW2 to the video memory 211 and the flash memory 212, respectively.

Once the image data to be displayed as the viewer's screen has been stored in the flash memory 212, the user may input the key for displaying the viewer's screen through the key input section 205, and thus the microcomputer 206 outputs the control signal Cm to the memory control section 210.

At this time, the memory input/output controller 304 in the memory control section 210 outputs the selection control signals Cs2, Sm to the switch 201 to switch the switch 201 and the multiplexer 302. Thereafter, the memory control section 210 outputs the control signals RW1, RW2 to the video memory 211 and the flash memory 212, respectively.

Accordingly, the data stored in the flash memory 212 is transferred to and stored in the video memory 211, the data stored in the video memory 211 is expanded by the MPEG decoder 303, and then the expanded data is outputted to the CRT 203 via the switch 201 to be displayed on the screen as the viewer's screen.

Figure 11:
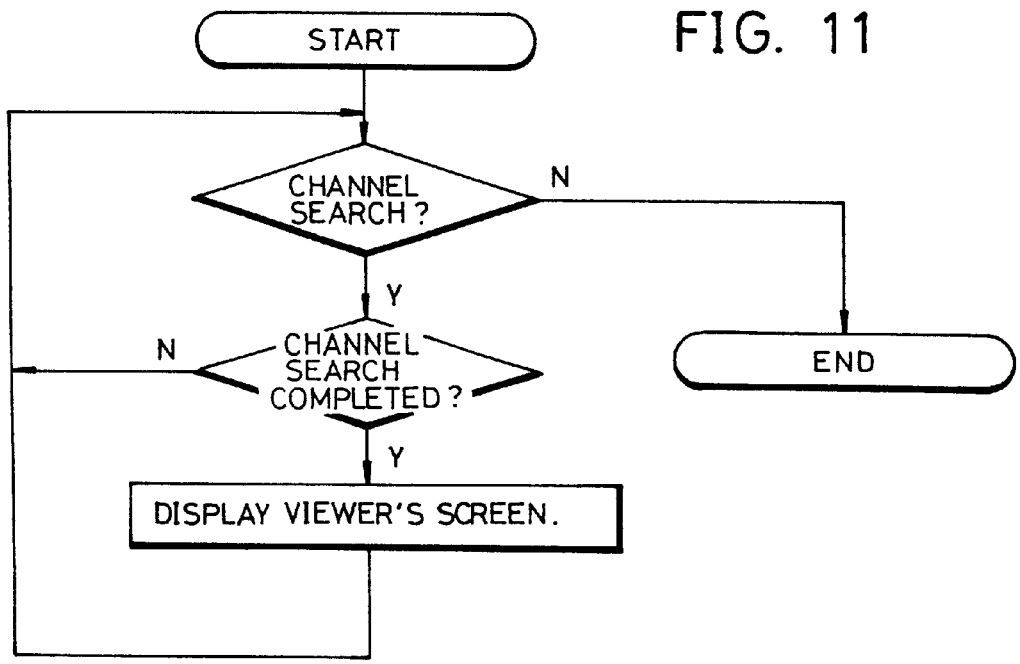
FIG. 11 is a flowchart illustrating the video processing step when a channel search key in inputted in the image data storage/display method according to the present invention.

Meanwhile, when the viewer's screen is displayed as described above, the viewer may edit the background image or the display year, month, and date, and messages relating to the viewer's screen, as illustrated in FIG. 11. Such an operation is performed by other embodiments of the present invention of FIGS. 4 and 5.

If the viewer inputs the image editing key through the key input section 205 while the still image for the viewer's screen is displayed on the screen of the CRT 203, the microcomputer 206 outputs the control signals Cm, Cd to the memory control section 210 and the on-screen processing section 216, respectively.

At this time, the on-screen processing section 216 outputs the on-screen data corresponding to the key selected by the viewer through the key input section 205, and the memory input/output controller 304 in the memory control section 210 outputs the selection control signal Cs2 to the switch 215, so that the switch 215 can switch the output signals from the D/A conversion section 213 and the on-screen processing section 216.

The video processing section 202 processes the output signal of the switch 216, and outputs the processed signal to the CRT 203 to display the image edited by the viewer on the screen of the CRT 203.

If the viewer inputs the key for storing image data for the viewer's screen through the key input section 205, the memory input/output controller 304 in the memory control section 210 receives the control signal Cm from the microcomputer 206, outputs the selection control signal Sm to the multiplexer 203a to connect the output terminal of the switch 216 to the video memory 211, and outputs the control signal RW1 to the video memory 211 to store the output signal Vd1 of the switch 216 in the video memory 211.

Thereafter the memory input/output controller 304 outputs the selection control signal Sm to the multiplexer 302a to connect the video memory 211 to the flash memory 212, and outputs the control signals RW1, RW2 to the video memory 211 and the flash memory 212 to store the edited image data in the flash memory 212.

Figure 12A:
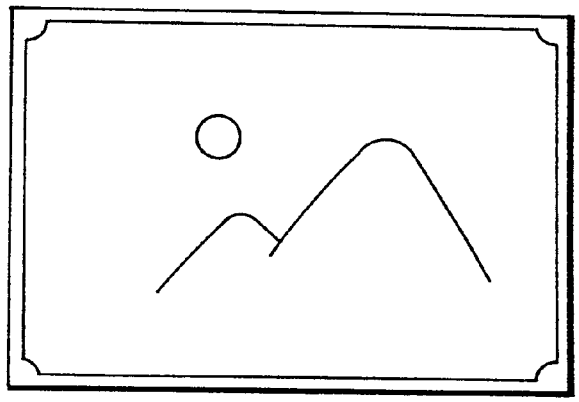
FIGS. 12A to 12C are exemplary diagrams of the screens displaying edited images according to the present invention.
Figure 12B:
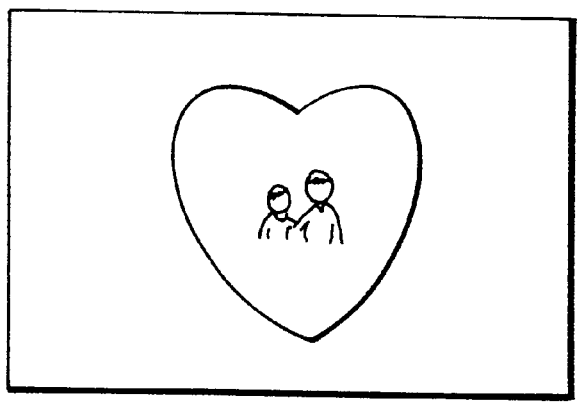
Figure 12C:
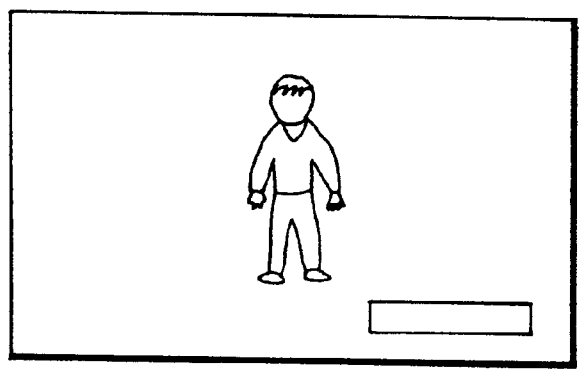

Practically, the background image can be edited to be displayed as a frame or in an arbitrary form as shown in FIGS. 12A and 12B. When editing the background image as shown in FIG. 12C, desired colors of the background image and messages relating to the image such as "Congratulations on the 100th Day from the Date of Birth of Your Baby!" or "Congratulations on your Wedding!" can be edited and displayed.

If the viewer inputs the key for displaying the viewer's screen through the key input section 205, the memory input/output controller 304 in the memory control section 210 receives the control signal Cm of the microcomputer 206, outputs the selection control signal Sm to the multiplexer 302a to connect the flash memory 212 to the video memory 211, and the control signals RW1, RW2 to the flash memory 212 and the video memory 211 to output the stored and edited image data to the video memory 211.

The data stored in the video memory 211 is decoded by the MPEG decoder 303 and converted into the analog signal by the D/A conversion section 213. The analog image signal is inputted to the CRT 203 via the switch 215 and the video processing section 202, so that the image for the viewer's screen is displayed on the CRT 203.

Figure 9:
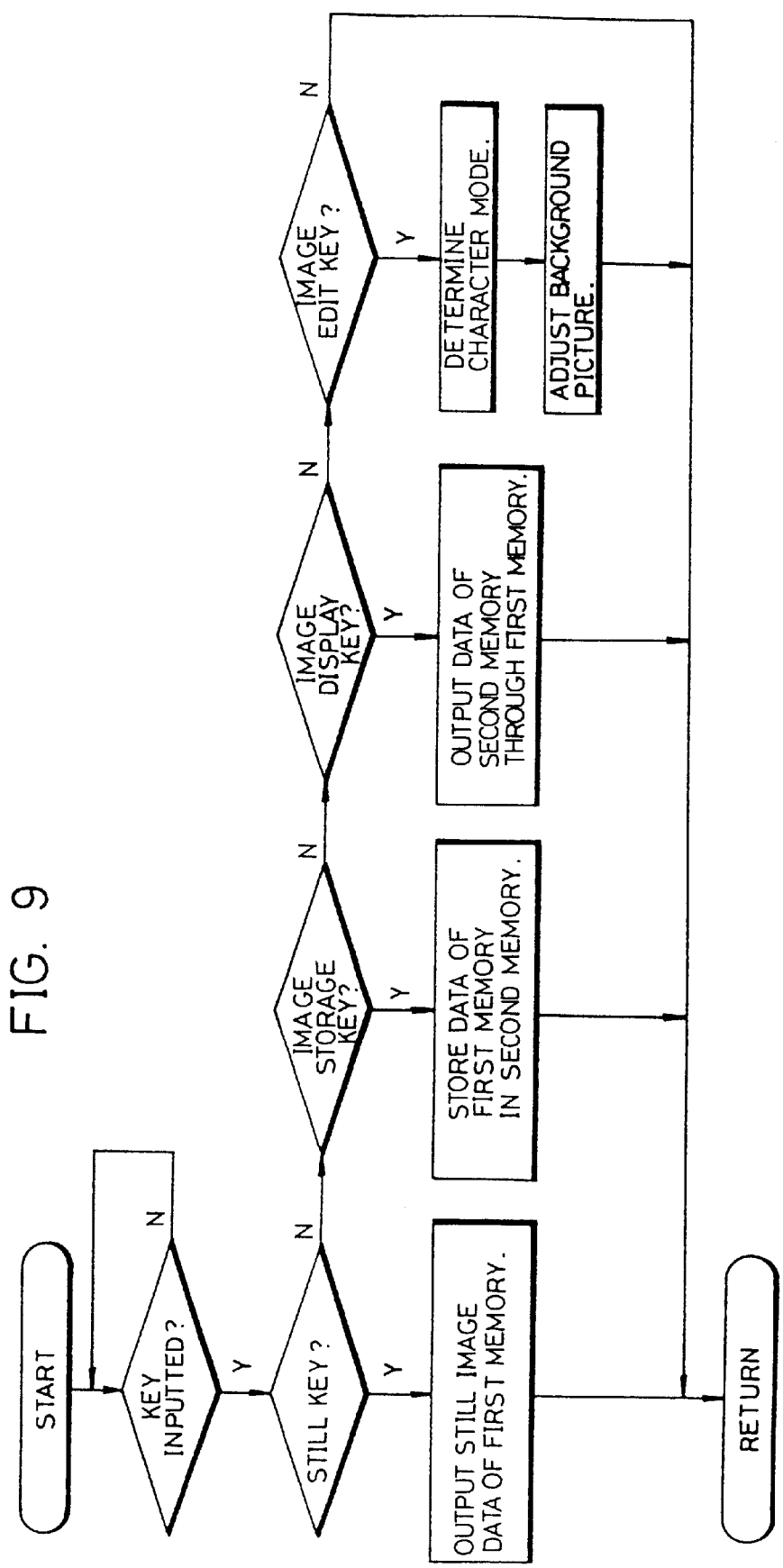
FIG. 9 is a flowchart illustrating the video processing step when a key is inputted in the image data storage/display method according to the present invention.

The above operation of storing, displaying, and editing the viewer's screen is performed as shown in the flowchart of FIG. 9.

In the embodiments of the present invention as described above, the video detecting section 204 detects whether or not the video signal Vp is inputted through the video input terminal 200. If no video signal is detected, the microcomputer 206 checks the output signal Vt of the video detection section 204, outputs the specified data among the image data stored in the flash memory 212 to display the image for the viewer's screen, and the control signal Cm to the memory control section 210, so that the switch 201 or 215 is switched.

The memory input/output controller 304 outputs the control signal Cm to the multiplexer 302 to connect the flash memory 212 to the video memory 211 as well as the control signals RW2, RW2 to the flash memory 212 and the video memory 211, respectively, and stores the data of the flash memory in the video memory 211. The memory input/output controller 304 also outputs the selection control signal Cs2, and connects the D/A conversion section 213 to the video processing section 202 by providing the selection control signal to the switch 201 or 215.

The data stored in the flash memory 212 is then transferred to the video memory 211, and then the data stored in the video memory 211 is outputted to the video processing section 202 through the D/A conversion section 213. The CRT displays the output signal of the video processing section 202 as the viewer's screen.

Figure 8:
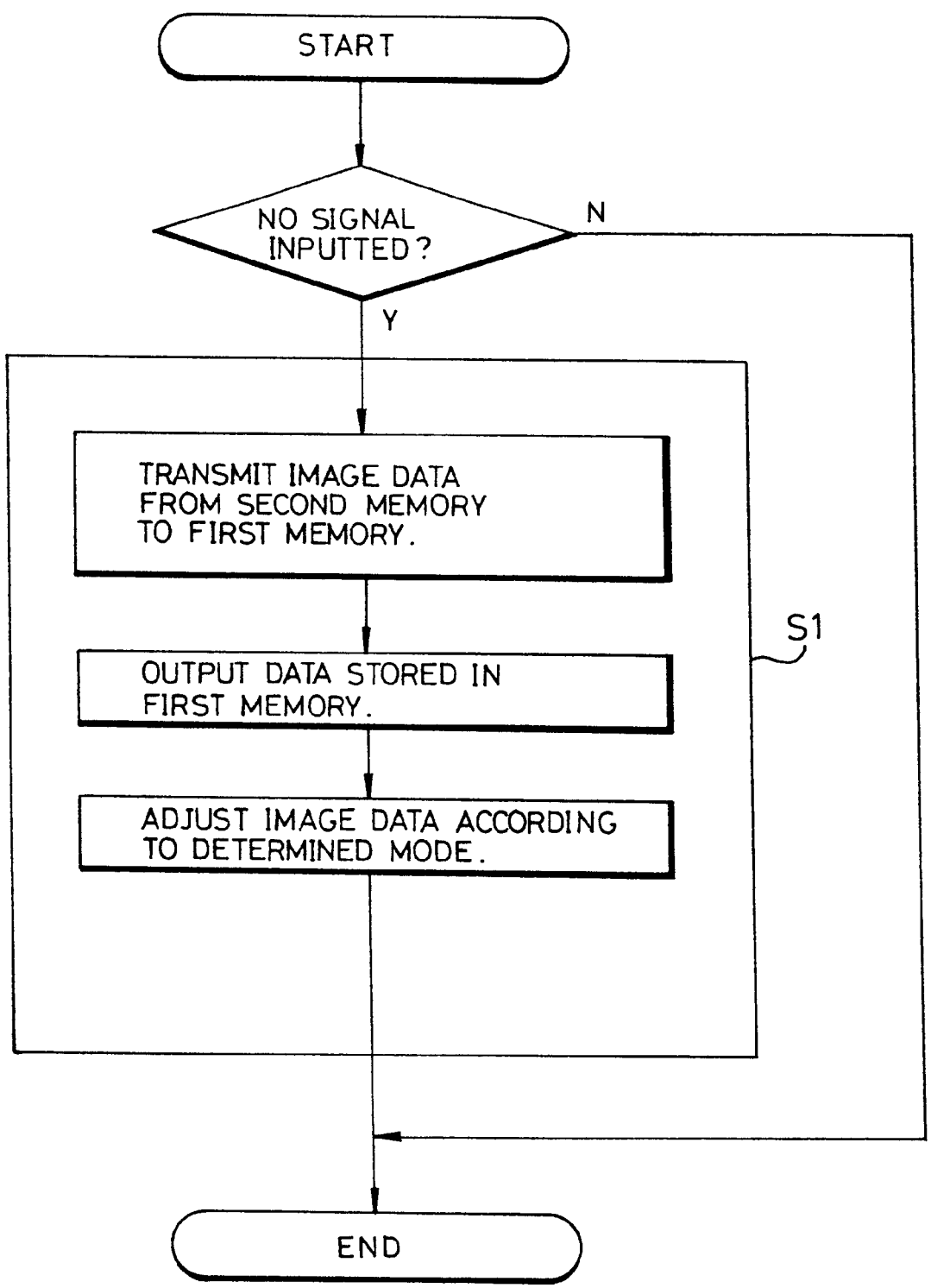
FIG. 8 is a flowchart illustrating the video processing step when no signal is inputted in the image data storage/display method according to the present invention.

The above displaying operation of the viewer's screen when no video signal is inputted is performed as shown in the flowchart of FIG. 8.

According to the present invention, it is determined that when the channel search for all the channels is completed, the viewer's screen is set to be displayed.

Specifically, if the viewer pushes the channel up/down key to view a specified broadcast, the corresponding channel is selected according to the tuning control signal outputted from the microcomputer 206. The video signal Vp of the selected channel is processed by the video processing section 202, and the CRT 203 displays the selected video signal on the screen as the viewer's screen.

Figure 13:
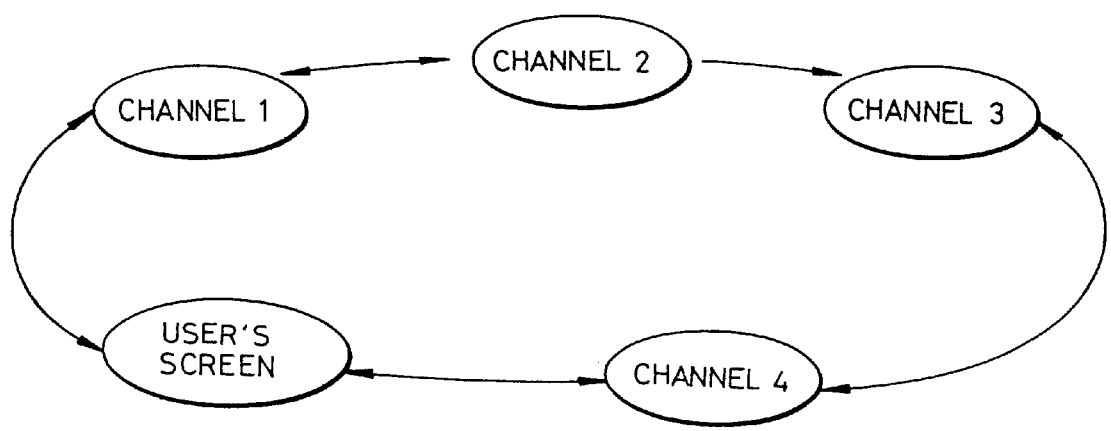
FIG. 13 is an exemplary diagram explaining the order of channel search.

If the channel search is continuously performed as shown in FIG. 13, the channels are sequentially changed. If the channel search is completed and the mode for displaying the image for the viewer's screen is set, the microcomputer 206 outputs the control signal Cm to the memory control section 210.

Accordingly, the memory control section 210 outputs the selection control signal Cs2 and the control signals RW1, RW2 to perform a routine S1 in the flowchart of FIG. 8. The data stored in the flash memory 212 is stored in the video memory 211, and the data stored in the video memory is outputted to the CRT 203 through the video processing section 202 to be displayed as the viewer's screen.

If the channel search is completed and the channel up/down key in the key input section 205 is selected during display of the viewer's screen, the channel search will be resumed.

The above operation of displaying the viewer's screen is performed as shown in the flowchart of FIG. 11.

Figure 10:
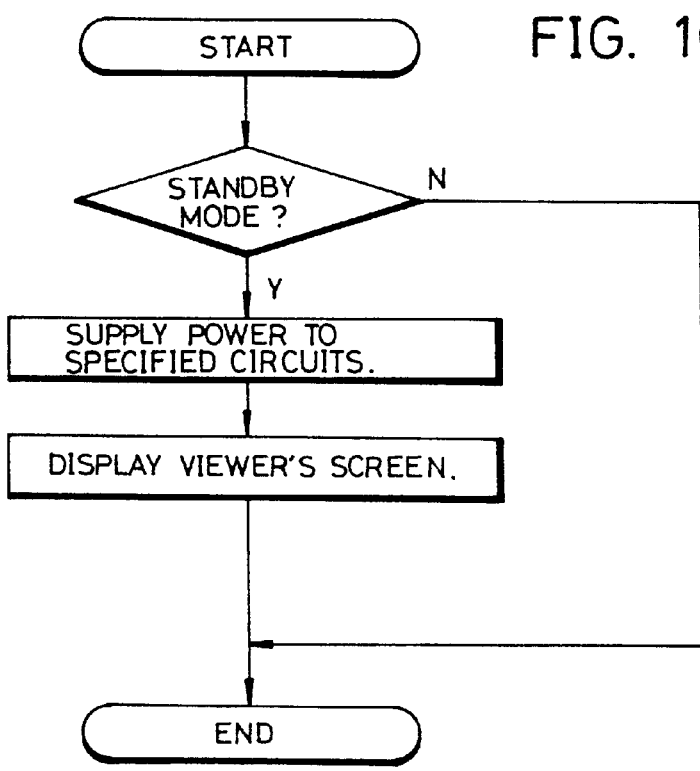
FIG. 10 is a flowchart illustrating the video processing step when a standby key is inputted in the image data storage/display method according to the present invention.

Meanwhile, the viewer's screen can also be displayed when a stand-by mode is set. Such operation is performed in the same procedure as shown in the flow chart of FIG. 10.

Specifically, the microcomputer 206 checks the output signal of the key input section 205. If the stand-by mode is detected, the microcomputer 206 controls the power supply section 207 to supply the power only to specified circuits such as the memory control section 210, the flash memory 212, the video processing section 202, the CRT 203, etc.

Accordingly, the memory control section 210 outputs the selection control signal Cs2 and the control signals RW1, RW2, so that the data stored in the flash memory 212 is stored in the video memory 211, and the data stored in the video memory 211 is outputted to the CRT 203 through the video processing section 202 to be displayed as the viewer's screen.

Figure 14A:
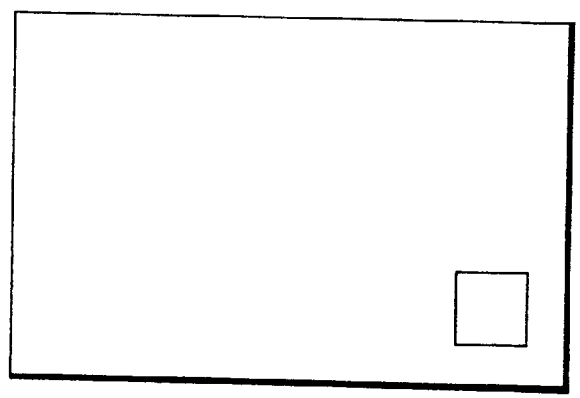
FIGS. 14A and 14B are exemplary diagrams illustrating the display state of a sub-picture.
Figure 14B:
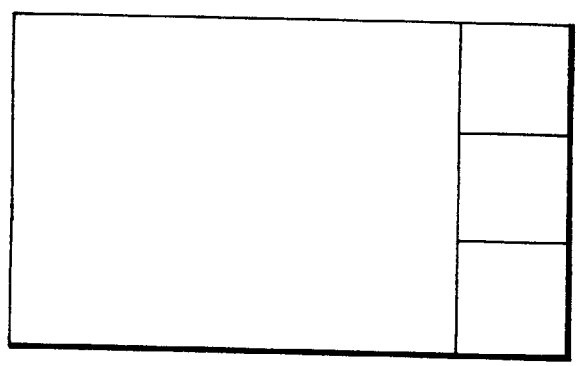

Also, in case that the present invention is applied to a TV having a picture-in-picture (PIP) function, the user may set a still mode to display a still image on the sub-picture region of the CRT if an image desired to be displayed as the viewer's screen exists when the sub-picture is displayed on the screen of the CRT 203 as shown in FIGS. 14A and 14B.

Figure 7:
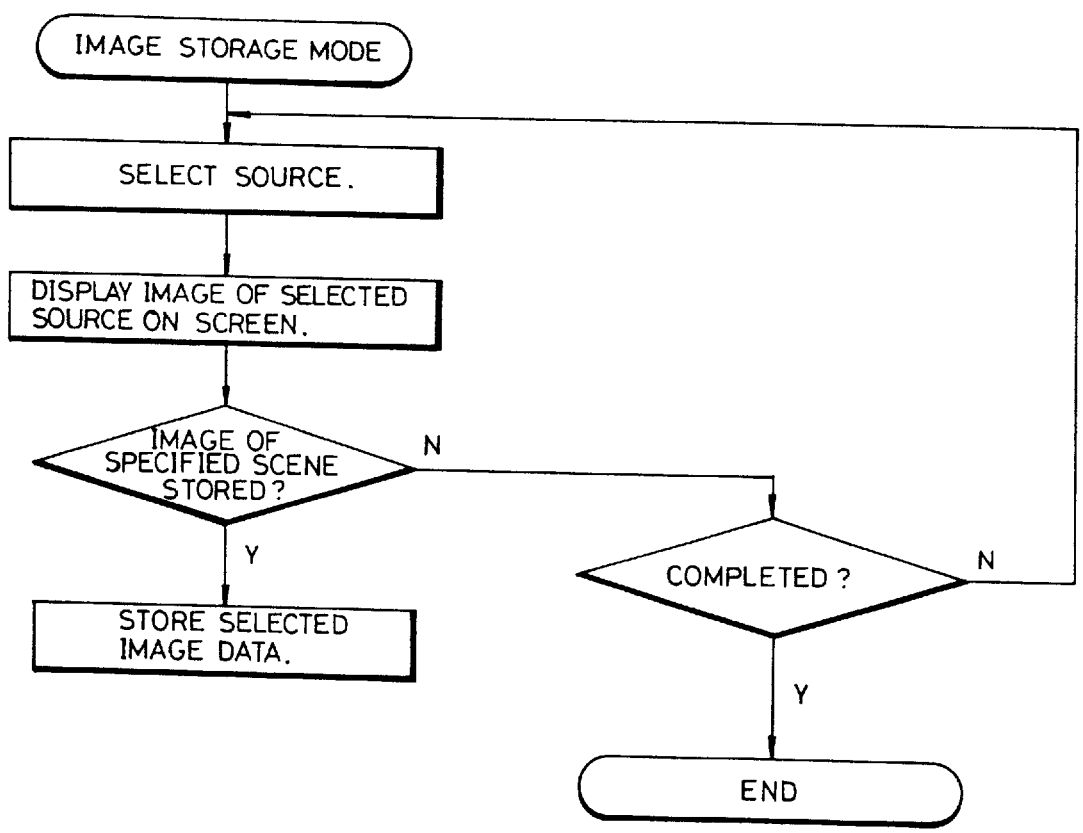
FIG. 7 is a flowchart illustrating the method of storing image data according to the present invention.

Thereafter, if the key for storing the image for the viewer's screen in the key input section 205 is inputted while the image is displayed on the screen, the same procedure as shown in the flowchart of FIG. 7 is performed. In other words, the microcomputer 206 controls the memory control section 210 to store image data for the viewer's screen. Accordingly, the above described procedure is performed to store the image data for the viewer's screen in the flash memory 212.

As described above, the present invention enables displaying the image for the viewer's screen under predetermined conditions such as when selecting an album display, when turning off the power supply to the TV, when no video signal is inputted, or when the channel is changed, etc. by storing a still image such as a photograph of a family.

From the foregoing, it will be apparent that the present invention provides advantages that it can reduce tedium of the viewer and heighten the product quality by displaying the image for the viewer's screen such as photographs of a family when no video signal is inputted, when the TV is turned off, or when the channel is changed.

While the present invention has been described and illustrated herein with reference to the preferred embodiments thereof, it will be understood by those skilled in the art that various changes in form and details may be made therein without departing from the spirit and scope of the invention.

What is claimed is:

1. An image data storage/display apparatus for a television receiver having a viewer's screen display function, comprising:
   video input means for inputting a video signal;
   a first memory for temporarily storing the video signal outputted from the video input means;
   a second memory for storing the video signal outputted from the first memory as image data for a viewer's screen;
   on-screen processing means for outputting on-screen display characaters and background data in a viewer's screen display mode;
   control means for controlling storage of the image data for the user's screen so that the video signal from the first memory is stored in the second memory, controlling the viewer's screen display so that the video signal stored in the second memory is outputted to the first memory, and controlling the on-screen processing means to display the on-screen display characters and background for the viewer's screen; and
   video processing means for receiving and processing the video signal outputted from the first memory.

2. The image data storage/display apparatus of claim 1, further comprising:
   a first switch for being switched to a video input terminal or the video input means to output the video data to the fist memory under the control of the control means; and
   a second switch for switching the video signal from the video input terminal or an output signal of the second memory and providing its output video signal to the video processing means under the control of the control means.

3. The image data storage/display apparatus of claim 1, further comprising video detecting means for detecting whether or not the video signal is inputted through the video input terminal, and outputting a detected signal to the control means so that the image for the viewer's screen is displayed when no video signal is inputted.

4. An image data storage/display apparatus for a television receiver having a viewer's screen display function, comprising:
   video input means for inputting a video signal;
   a first memory for temporarily storing the video signal outputted from the video input means;
   a second memory for storing the video signal outputted from the first memory as image data for a viewer's screen;
   on-screen processing means for outputting on-screen display characters and background data in a viewer's screen display mode;
   memory control means for controlling storage of the image data for the user's screen so that the video signal from the first memory is stored in the second memory, and controlling data input/output through the first and second memories so that the video signal stored in the second memory is outputted to the first memory;
   video processing means for receiving and processing the video signal outputted from the first memory; and
   control means for controlling the memory control means, the on-screen processing means, and the video processing means to store and display the image data for the viewer's screen according to a key input through a key input means or a predetermined condition.

5. The image data storage/display apparatus of claim 4, further comprising:
   a first switch for being switched to a video input terminal or the video input means to output the video data to the first memory under the control of the control means; and
   a second switch for switching the video signal from the video input terminal or an output signal of the second memory and providing its output video signal to the video processing means under the control of the control means.

6. The image data storage/display apparatus of claim 4, further comprising video detecting means for detecting whether or not the video signal is inputted through the video input terminal, and outputting a detected signal to the control means so that the image for the viewer's screen is displayed when no video signal is inputted.

* * * * *